(No Model.)
J. A. BUISSON.
ELECTRIC ALARM SIGNAL AND INDICATOR FOR TROLLEY RAILROADS.
No. 541,341. Patented June 18, 1895.
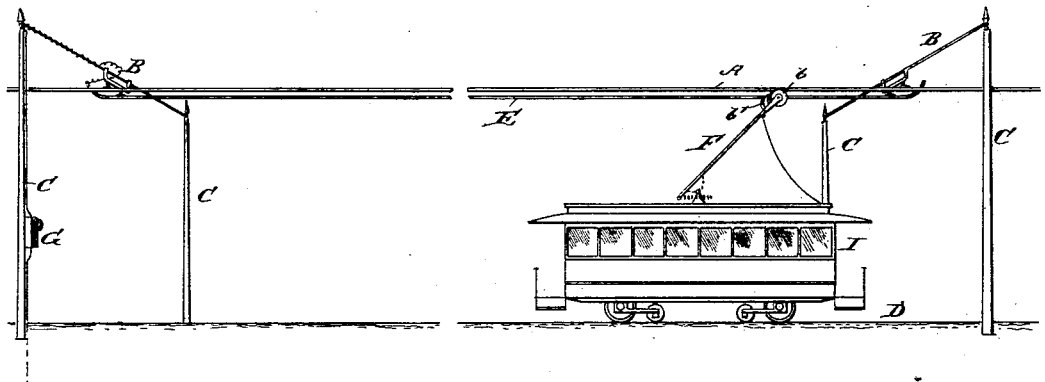
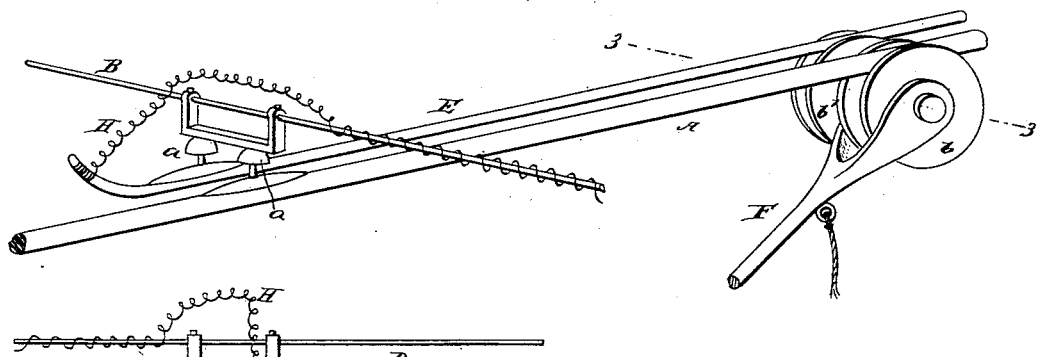
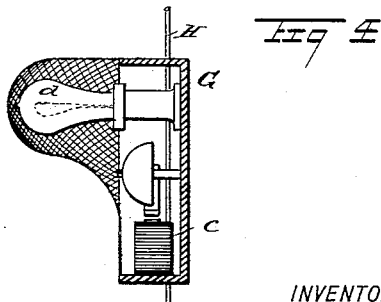
WITNESSES:
INVENTOR
BY
ATTORNEYS.

UNITED STATES PATENT OFFICE.

JACQUES ADOLPH BUISSON, OF NEW ORLEANS, LOUISIANA.

ELECTRIC ALARM SIGNAL AND INDICATOR FOR TROLLEY RAILROADS.

SPECIFICATION forming part of Letters Patent No. 541,341, dated June 18, 1895.

Application filed April 2, 1895. Serial No. 544,159. (No model.)

*To all whom it may concern:*

Be it known that I, JACQUES ADOLPH BUISSON, of New Orleans, in the parish of Orleans and State of Louisiana, have invented a new and Improved Electric Alarm Signal and Indicator for Trolley Railroads, of which the following is a full, clear, and exact description.

The object of my invention is to provide a simple and effective signal and alarm for crossings, curves and other dangerous places on a trolley railroad.

My invention consists in the combination with the main trolley wire, of a short auxiliary trolley wire supported parallel with the main wire, but insulated therefrom, an alarm and signal connected electrically with the auxiliary trolley wire, and a double trolley for establishing electrical connection between the main and auxiliary trolley wires, all as will be hereinafter more fully described.

Reference is to be had to the accompanying drawings, forming a part of this specification, in which similar letters of reference indicate corresponding parts in all the views.

Figure 1 is a side elevation of a section of a trolley railroad, showing the application of my improvement. Fig. 2 is an enlarged perspective view showing the support and electrical connection of the auxiliary wire. Fig. 3 is a transverse section taken on line 3 3 in Fig. 2, and Fig. 4 is a vertical transverse section of the alarm and signal box.

The main trolley wire A is supported by cross wires B attached to poles C in the usual way above the railroad track D. The suspension devices of the trolley wire at the place where the signal is desired are of sufficient width to support an auxiliary trolley wire E, which may extend from one of the cross suspension wires B to the next adjacent wire, or it may be of sufficient length to include a greater space.

The auxiliary trolley wire E is first connected at each end with one of the insulators a, which are four in number, two for each wire and which are fixed two to each of the two respective U-shaped bars shown in the drawings; and the said bars are in turn connected to the respective suspension wires B. The ends of the auxiliary trolley wire outside of the insulators are curved upwardly to facilitate the reception of the trolley and for a second purpose that will hereinafter appear. The trolley arm F, attached to the top of the car in the usual way, is provided with a trolley wheel $b$ which rolls upon the main trolley support and the pin upon which the trolley wheel $b$ revolves is extended to receive a trolley wheel $b'$ which is capable of rolling on the auxiliary trolley wire E.

To one of the poles C is attached a signal box G, containing an electric alarm bell $c$ and an electric lamp $d$. An insulated wire H is connected with the end of the auxiliary trolley wire E, and is carried along the cross wire B, thence down the pole supporting the alarm and signal box, where it is connected with both the lamp and the alarm bell, and the lamp and bell are grounded by means of wires extending down the pole.

The wire H is connected to one of the upturned ends of the auxiliary wire by wrapping the same; and by means of this upturned end the trolley is not only guided upon the wire as explained above, but the connection of the wire H is protected from the forcible contact with the trolley, thereby prolonging the life of the former.

When the car I, carrying the trolley arm F passes along the portion of the track to be protected by the signal and alarm, the double trolley wheels roll on the main and auxiliary trolley wires A, E, making an electrical connection between the trolley wires, thus sending a current through the lamp and alarm bell to the ground, sounding the alarm and also giving a visible signal.

My improved device is designed to be applied at crossings and curves and it may be placed in tunnels and dark places.

The signal box G may be placed as shown in a position adjoining the auxiliary trolley wire, or it may be located at some distance in advance of the auxiliary trolley wire if desired.

Having thus described my invention, I claim as new and desire to secure by Letters Patent—

1. The combination with a main trolley wire or feeder, of an auxiliary wire extended parallel and horizontally aligned therewith, the auxiliary wire being of comparatively short length, an insulator connected at each end of the auxiliary wire, two additional insulators on the main wire and opposite those on the auxiliary wire, two U-shaped bars respectively connected with the opposite insulators and having their parallel portions projected upwardly from the insulators, and a supporting wire for each U-shaped bar, the same being connected to the ends of the parallel portions of the bar, substantially as described.

2. The combination with a main trolley wire or feeder, of a short auxiliary wire extended parallel therewith and in the same horizontal plane, means for rigidly and mechanically connecting the two wires, the ends of the auxiliary wire being turned up to form upwardly inclined planes or shoes capable of readily receiving a trolley wheel, and a wire H connected to one upturned end of the auxiliary wire, the said connection being out of the plane in which the main portion of the auxiliary wire is located, substantially as described.

JACQUES ADOLPH BUISSON.

Witnesses:
GEORGE H. GRANDJEAN,
LÉON J. FRÉMAUX.